(12) United States Patent
Kim

(10) Patent No.: US 8,094,989 B2
(45) Date of Patent: Jan. 10, 2012

(54) METHOD AND APPARATUS FOR GENERATING EXTERNAL INPUT TABLE

(75) Inventor: Hyo-dae Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1324 days.

(21) Appl. No.: 11/691,108

(22) Filed: Mar. 26, 2007

(65) Prior Publication Data

US 2008/0104281 A1    May 1, 2008

(30) Foreign Application Priority Data

Oct. 31, 2006  (KR) .................. 10-2006-0106701

(51) Int. Cl.
*H04N 5/765* (2006.01)
*H04N 5/93* (2006.01)

(52) U.S. Cl. ....................... 386/200; 386/353

(58) Field of Classification Search .............. 386/200, 386/291, 239, 248, 353
See application file for complete search history.

(56) References Cited

U.S. PATENT DOCUMENTS

2009/0262256 A1 * 10/2009 Asayama et al. ............. 348/738

FOREIGN PATENT DOCUMENTS

| JP | 9-230968 A | 9/1997 |
| JP | 11-355328 A | 12/1999 |
| KR | 10-2005-0097754 A | 10/2005 |
| KR | 10-2006-0011534 A | 2/2006 |

* cited by examiner

*Primary Examiner* — Robert Chevalier
(74) *Attorney, Agent, or Firm* — Sughrue Mion, PLLC

(57) ABSTRACT

Provided are a method and apparatus for generating an external input table in a device reproducing an AV signal. The method of generating an external input table includes receiving a reproduction request for reproducing an AV signal from another device and determining whether an external input is assigned to the another device by referring to the external input table, and selectively assigning one of external inputs of the device reproducing the AV signal to the another device according to the determination result. Accordingly, since an external input of an AV device can be dynamically set from an external device while minimizing a user's manipulation, user convenience in terms of setting the external input can be improved.

23 Claims, 7 Drawing Sheets

FIG. 3

| Aux 1 | — |
|---|---|
| Aux 2 | — |
| Optical 1 | TV |
| Optical 2 | DVD |
| Coaxial 1 | — |
| Coaxial 2 | STB |
| ⋮ | ⋮ |

METHOD AND APPARATUS FOR GENERATING EXTERNAL INPUT TABLE

CROSS-REFERENCE TO RELATED PATENT APPLICATION

This application claims priority from Korean Patent Application No. 10-2006-0106701, filed on Oct. 31, 2006, in the Korean Intellectual Property Office, the disclosure of which is incorporated herein in its entirety by reference.

BACKGROUND OF THE INVENTION

1. Field of the Invention

The present invention relates to a method and apparatus for generating an external input table, and more particularly, to a method and apparatus for generating an external input table containing information on external inputs of an Audio-Visual (AV) device and information on external devices respectively assigned to the external inputs.

2. Description of the Related Art

FIG. 1 is a block diagram of a related art AV system.

Referring to FIG. 1, an AV receiver 101 receiving an audio signal from the outside and reproducing the received audio signal is connected to a television (TV) 102, a set-top box (STB) 103, and a Digital Versatile Disc (DVD) player 104 through first, second, and third external inputs, respectively.

The 'external input' is an input terminal for receiving an AV signal from the outside through a connection cable, such as coaxial cable, component cable, composite cable, Sony/Philips Digital Interface (S/PDIF) cable, or High-Definition Multimedia Interface (HDMI) cable, and for transmitting the AV signal.

In addition, in the related art AV system, AV devices may form an additional network for control between them as well as acting as an input terminal for receiving an AV signal.

If a cable for connecting to an external input is an HDMI cable, besides the cable for transmitting an AV signal, an additional network for HDMI-Consumer Electronics Control (CEC) is connected between the AV devices as illustrated in FIG. 1. That is, by using HDMI-CEC, a user can control power of the AV receiver 101 through the TV 102 or control the AV receiver 101 to reproduce an audio signal of the TV 102. In more detail, the user can control the AV receiver 101 to reproduce the audio signal of the TV 102 by controlling the AV receiver 101 by means of a user interface (UI) provided on a screen of the TV 102 which the user is viewing. In this case, while a control signal is transmitted and received via the HDMI-CEC network, the AV signal is transmitted from the TV 102 to the AV receiver 101 through the first external input.

However, in FIG. 1, the only device that the TV 102 can control is the AV receiver 101, and the user cannot control the STB 103 or the DVD player 104 using the TV 102. Thus, if the user desires to hear sounds of the DVD player 104 using the AV receiver 101 while viewing moving pictures reproduced by the DVD player 104 using the TV 102, the user must additionally set the DVD player 104 to reproduce an AV signal received through the third external input.

In addition, even when the audio signal of the TV 102 is reproduced through the AV receiver 101, the user can control the AV receiver 101 to reproduce the audio signal of the TV 102, only if the TV 102 is connected to a specific external input of the AV receiver 101 or the user previously knows which external input of the AV receiver 101 is connected to the TV 102.

Thus, a method and apparatus for reproducing an AV signal of an external device through the AV receiver 101 without the user having to perform complex operations is required.

SUMMARY OF THE INVENTION

The present invention provides a method and apparatus for generating an external input table containing information on external inputs of an AV device and information on external devices respectively assigned to the external inputs, so that the external input table can be referred to when an AV signal of an external device is reproduced.

The present invention provides a computer readable recording medium storing a computer program for performing the method.

According to an aspect of the present invention, there is provided a method of generating an external input table in a device reproducing an AV signal that is received through an external input by referring to the external input table, the method comprising: receiving a reproduction request for reproducing an AV signal of another device from a control device controlling the device reproducing the AV signal, and determining whether an external input is assigned to another device by referring to the external input table; and selectively assigning one of external inputs of the device reproducing the AV signal to the another device according to the determination result, wherein the external input table contains information on the external inputs of the device reproducing the AV signal and information on devices respectively assigned to the external inputs.

The device reproducing the AV signal may be connected to the control device by HDMI-CEC.

According to another aspect of the present invention, there is provided a method of generating an external input table in a device reproducing an AV signal that is received through an external input by referring to the external input table, the method comprising: receiving a reproduction request for reproducing the AV signal from a source device transmitting the AV signal, and determining whether an external input is assigned to the source device by referring to the external input table; and selectively assigning one of external inputs of the device reproducing the AV signal to the source device according to the determination result, wherein the external input table contains information on the external inputs of the device reproducing the AV signal and information on devices respectively assigned to the external inputs.

The selectively assigning may comprise, if it is determined that no external input is assigned to the source device, detecting an external input through which the AV signal is received; and assigning the detected external input to the source device.

According to another aspect of the present invention, there is provided an apparatus for generating an external input table in a device reproducing an AV signal that is received through an external input by referring to the external input table, the apparatus comprising: a determiner which receives a reproduction request for reproducing an AV signal of another device from a control device controlling the device reproducing the AV signal, and determines whether an external input is assigned to another device by referring to the external input table; and an assignment unit which selectively assigns one of external inputs of the device reproducing the AV signal to the another device according to the determination result, wherein the external input table contains information on the external inputs of the device reproducing the AV signal and information on devices respectively assigned to the external inputs.

According to another aspect of the present invention, there is provided an apparatus for generating an external input table in a device reproducing an AV signal that is received through an external input by referring to the external input table, the apparatus comprising: a determiner which receives a reproduction request for reproducing the AV signal from a source device transmitting the AV signal, and determines whether an external input is assigned to the source device by referring to the external input table; and an assignment unit which selectively assigns one of external inputs of the device reproducing the AV signal to the source device according to the determination result, wherein the external input table contains information on the external inputs of the device reproducing the AV signal and devices respectively assigned to the external inputs.

According to another aspect of the present invention, there is provided a computer readable recording medium storing a computer program for performing the methods of generating an external input table.

BRIEF DESCRIPTION OF THE DRAWINGS

The above and other aspects of the present invention will become more apparent by describing in detail exemplary embodiments thereof with reference to the attached drawings in which:

FIG. 3 illustrates an external input table according to an exemplary embodiment of the present invention;

DETAILED DESCRIPTION OF EXEMPLARY
EMBODIMENTS OF THE INVENTION

Hereinafter, exemplary embodiments of the present invention will be described in detail with reference to the accompanying drawings.

Figure 2:
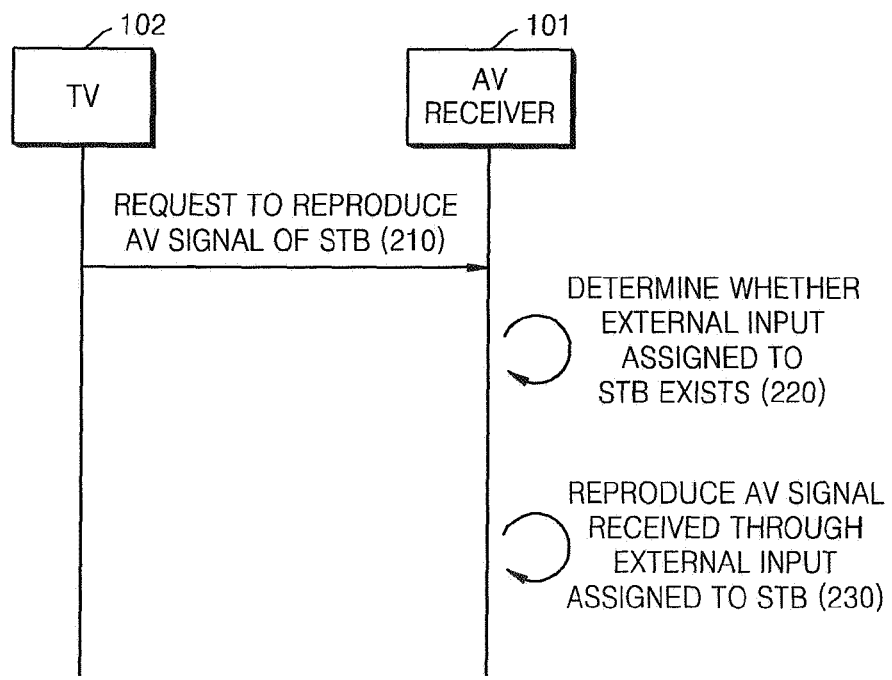
FIG. 2 is a signaling diagram of a method of reproducing an AV signal according to an exemplary embodiment of the present invention.

FIG. 2 is a signaling diagram of a method of reproducing an Audio-Visual (AV) signal according to an exemplary embodiment of the present invention.

Figure 1:
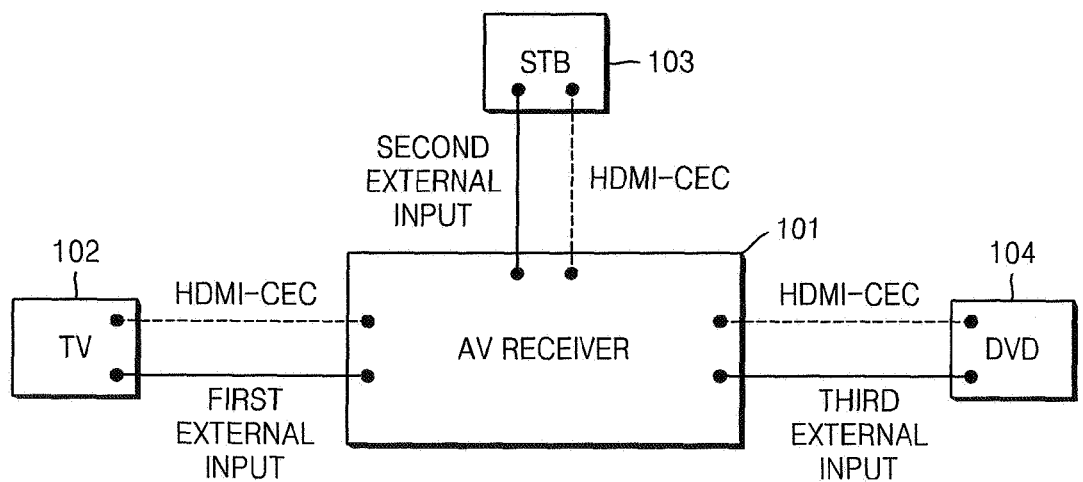
FIG. 1 is a block diagram of a related art AV system.

FIG. 2 illustrates a case where a TV 102 controls an AV receiver 101 in order to reproduce an AV signal of a STB 103 through the AV receiver 101 in the AV system illustrated in FIG. 1. That is, in FIG. 2, the TV 102 is a control device, and the AV receiver 101 is an AV device controlled by the control device.

In operation 210, the TV 102 requests the AV receiver 101 to reproduce an AV signal of the STB 103. In more detail, a user who has been reproducing video and audio signals from the STB 103 using the TV 102 requests the AV receiver 101 to reproduce the audio signal from the STB 103 through the TV 102, in order to reproduce the audio signal from the STB 103 using the AV receiver 101. In this case, the STB 103 and the AV receiver 101 must be connected to each other via a predetermined external input.

That is, the reproduction of the AV signal is requested by the TV 102 transmitting a message for requesting the AV receiver 101 to reproduce the AV signal of a specific AV device. Since the TV 102 requests the AV receiver 101 to reproduce the AV signal of the specific AV device, the message transmitted by the TV 102 contains information for identifying the AV device from which the AV signal is reproduced. For example, an address or identifier (ID) of each device in the AV network illustrated in FIG. 1 may be contained in the message as the information for identifying the AV device. Thus, in operation 210, the TV 102 transmits a request message containing a device address or ID of the STB 103 to the AV receiver 101.

The request message is a message transmitted to control the AV receiver 101 and is transmitted through a predetermined network instead of an external input. The predetermined network may be the network connected using HDMI-CEC as illustrated in FIG. 1. However, types of the predetermined network are unlimited only if the predetermined network is a network connected to control devices that are connected to each other. That is, the predetermined network may be a wireless communication network using infrared rays, such as Infrared Data Association (IrDA), or an Internet Protocol (IP)-based wireless network, such as a Wireless Local Area Network (WLAN).

In operation 220, the AV receiver 101 determines, by referring to a predetermined external input table, whether an external input assigned to the STB 103, for which the reproduction of the AV signal is requested in operation 210, exists.

FIG. 3 illustrates an external input table according to an exemplary embodiment of the present invention.

Referring to FIG. 3, the external input table contains information on external inputs of the AV receiver 101 and information on devices respectively assigned to the external inputs. In order to transmit and receive an AV signal to and from various AV devices, AV devices generally have a plurality of external inputs. Thus, the AV receiver 101, which has received the reproduction request in operation 210, can reproduce the AV signal of the STB 103, only when the AV receiver 101 has previously detected information regarding which external device is connected to each external input. In order to reproduce the AV signal of the STB 103, the AV receiver 101 has the external input table containing the information on external inputs for receiving the AV signal and the information on the AV devices respectively assigned to the external inputs and processes the reproduction request of operation 210 by referring to the external input table.

According to FIG. 3, the AV receiver 101 has the external inputs, such as AUX1, AUX2, Optical1, Optical2, Coaxial1, and Coaxial2. It is assumed that the external input Optical1 is assigned to the TV 102, the external input Optical2 is assigned to the DVD player 104, and the external input Coaxial2 is assigned to the STB 103.

The external input table illustrated in FIG. 3 is only an illustration in which a predetermined AV device assigns a plurality of external inputs to a plurality of external devices, and the external input table is not limited thereto. Thus, the external input table can be modified, only if external inputs of an AV device are respectively assigned to external devices and can be referred to when an AV signal is reproduced.

Referring back to FIG. 2, in operation 230, the AV receiver 101 reproduces the AV signal received through an external input assigned to the STB 103. According to FIG. 3, since the external input Coaxial2 is assigned to the STB 103, the AV receiver 101 reproduces the AV signal received through the external input Coaxial2.

The user can reproduce the audio signal from the AV receiver 101 by manipulating the TV 102 in operations 210, 220, and 230. In this case, the user can reproduce the audio signal by just selecting a request for reproducing the audio signal from the STB 103 in the AV receiver 101 on the UI provided by the TV 102, without having to perform a complex manipulation of an external input of the AV receiver 101.

Figure 4:
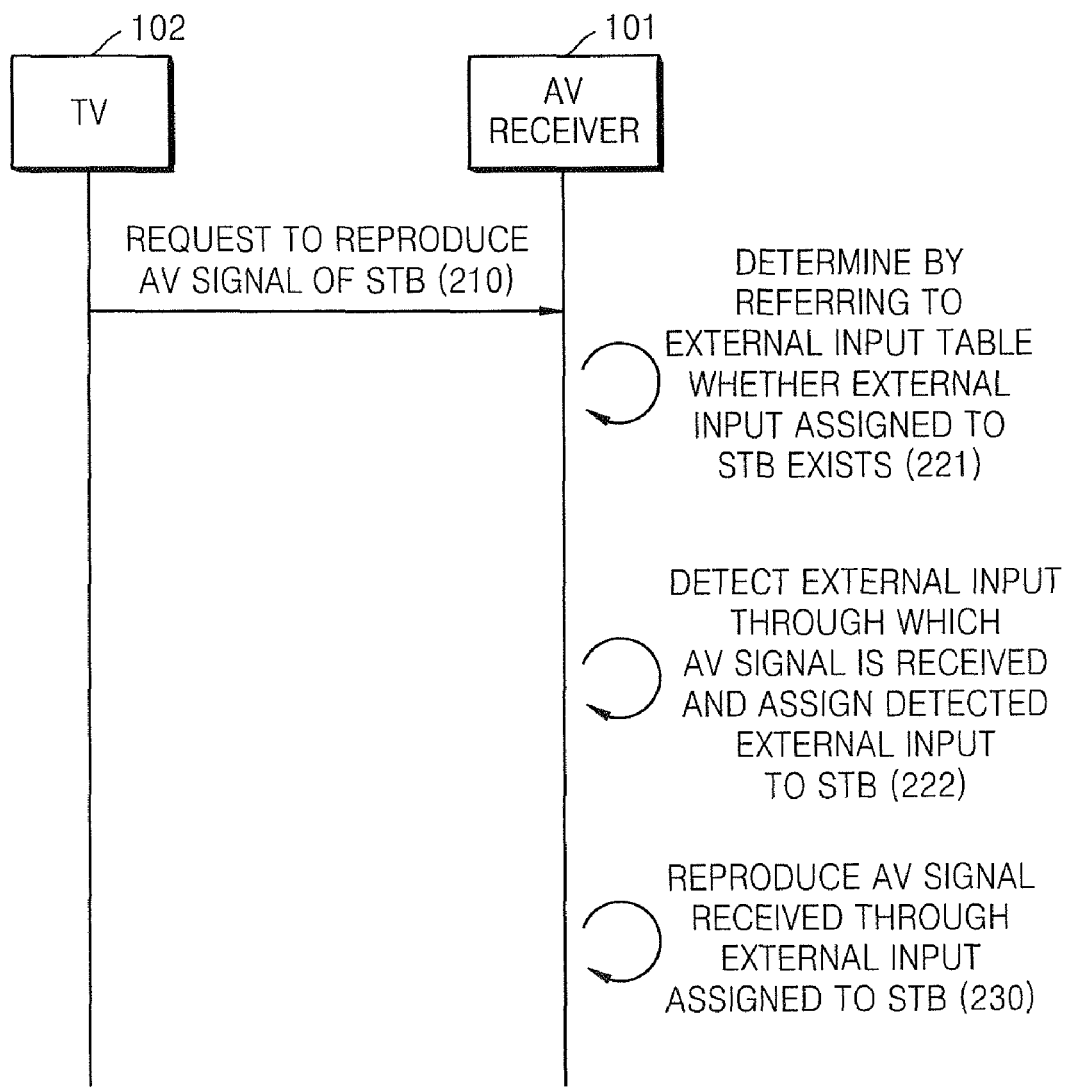
FIG. 4 is a signaling diagram of a method of reproducing an AV signal according to another exemplary embodiment of the present invention.

FIG. 4 is a signaling diagram of a method of reproducing an AV signal according to another exemplary embodiment of the present invention.

The external input table illustrated in FIG. 3 illustrates a case where an external input assigned to the STB 103 exists. However, a case where no information on the STB 103 is contained in an external input table may also exist. That is, a case where the STB 103 is newly connected to the AV receiver 101 may exist. In this case, a new external input table must be generated in order to contain the information on the STB 103, and FIG. 4 illustrates a method of generating the new external input table.

Referring to FIG. 4, in operation 221, the AV receiver 101 determines, by referring to a predetermined external input table, whether an external input assigned to the STB 103 exists.

If an external input Coaxial2 is assigned to the STB 103 as in the external input table illustrated in FIG. 3, in operation 230, the AV receiver 101 reproduces an AV signal received from the STB 103 through the external input Coaxial2.

However, if the AV receiver 101 initially reproduces an AV signal of the STB 103, no external input is yet assigned to the STB 103. Thus, in operation 222, the AV receiver 101 assigns an external input to the STB 103.

That is, in operation 222, the AV receiver 101 detects an external input through which the AV signal from the STB 103 is to be received, and assigns the detected external input to the STB 103.

Various methods of detecting an external input may exist. If the received AV signal is a digital video signal, a terminal, from which a pilot signal included in the digital video signal is detected, may be detected as an external input through which the AV signal is to be received. If the received AV signal is an analog AV signal, a terminal, from which a magnitude of the analog AV signal is detected as a predetermined magnitude, may be detected as an external input through which the AV signal is to be received.

If the external input is detected, the predetermined external input table is modified so that the detected external input is assigned to the STB 103.

Figure 5:
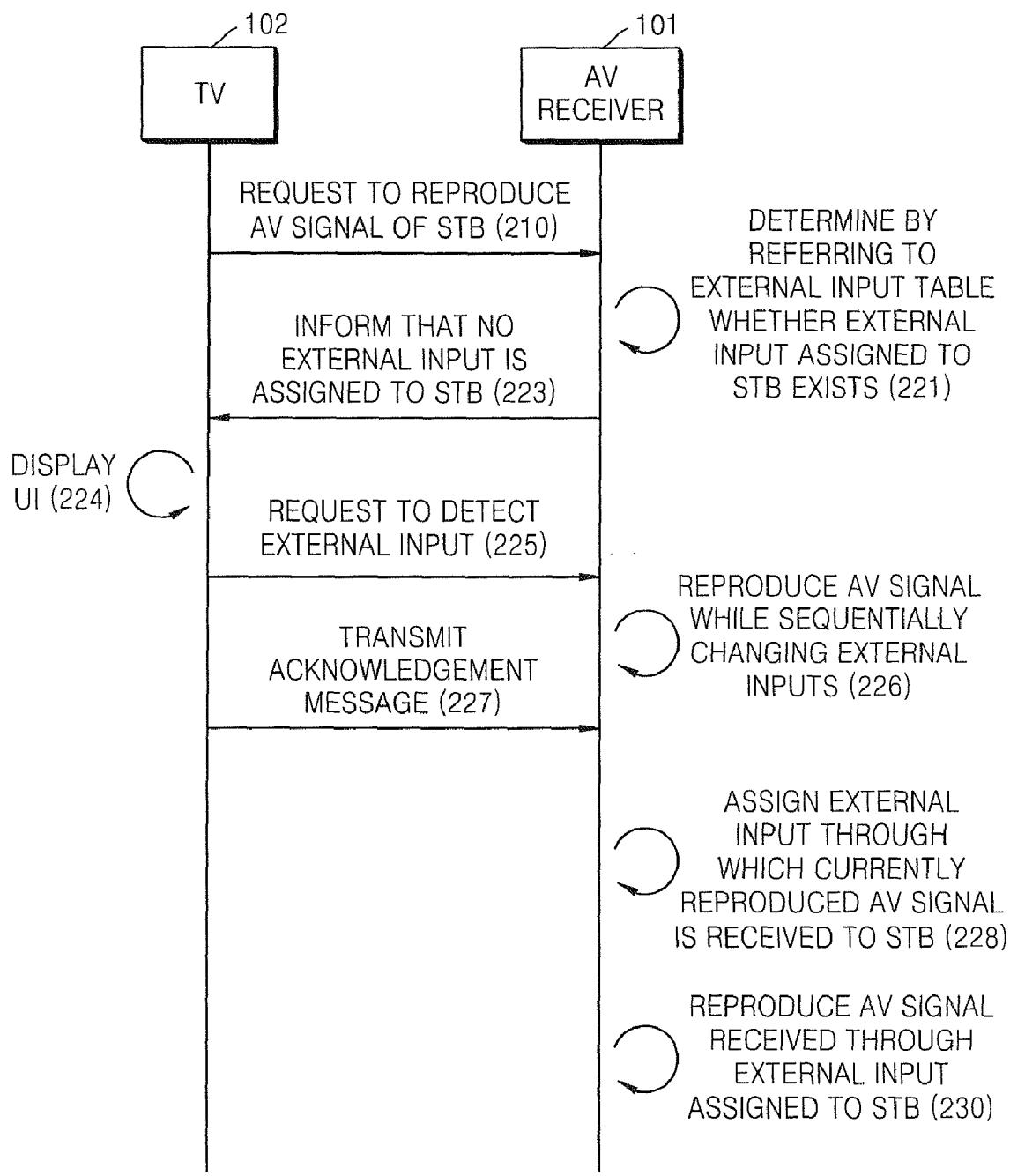
FIG. 5 is a signaling diagram of a method of reproducing an AV signal according to another exemplary embodiment of the present invention.

FIG. 5 is a signaling diagram of a method of reproducing an AV signal according to another exemplary embodiment of the present invention.

In operation 222 illustrated in FIG. 4, the AV receiver 101 can actively detect an AV signal. However, the AV receiver 101 cannot receive all AV signals. Thus, when the AV receiver 101 cannot receive an AV signal, a method of detecting an external input, through which the AV signal is received, by a simple manipulation performed by a user, and generating an external input table based on the detection is required.

Referring to FIG. 5, in operation 223, the AV receiver 101 transmits a message informing the TV 102 that no external input is assigned to the STB 103.

The AV receiver 101 transmits the message in operation 223 only if the AV receiver 101 determines, in operation 221, that no external input is assigned to the STB 103. If an external input has already been assigned to the STB 103, the AV receiver 101 reproduces an AV signal received through the assigned external input in operation 230.

In operation 224, the TV 102 displays a predetermined UI for a user to manipulate on a display module.

Figure 6:
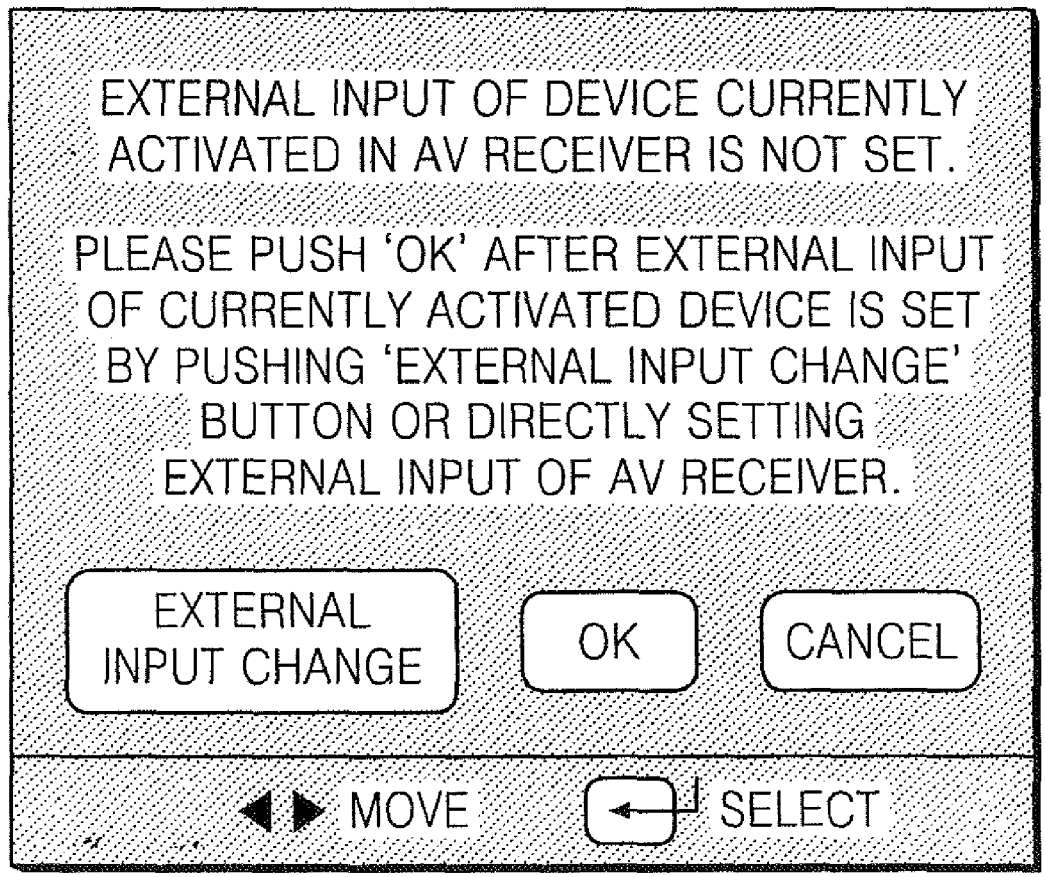
FIG. 6 illustrates a UI for detecting an external input according to an exemplary embodiment of the present invention.

FIG. 6 illustrates a UI for generating an external input table according to an exemplary embodiment of the present invention.

Referring to FIG. 6, in operation 224, the UI provided to the user informs the user that none of the external inputs of the AV receiver 101 are assigned to the STB 103. In addition, the UI includes an 'external input change' item for detecting an external input through which an AV signal is received. The UI also separately provides a 'cancel' item for allowing the user to cancel the detection of an external input. A method of controlling the AV receiver 101 using the UI will be described later.

Referring back to FIG. 5, in operation 225, the TV 102 transmits a message for requesting to detect an external input to the AV receiver 101.

If the user selects the 'external input change' item of the UI illustrated in FIG. 6, the TV 102 transmits to the AV receiver 101 a message for requesting to detect an external input through which an AV signal is received.

In operation 226, the AV receiver 101 reproduces an AV signal received through an external input while sequentially changing the external inputs thereof. That is, the AV receiver 101 reproduces an AV signal while sequentially changing the external inputs of the AV receiver 101 so that the user can perceive the external input through which an AV signal of the STB 103 is received.

If the AV receiver 101 receives a message for requesting to detect an external input from the TV 102, the AV receiver 101 reproduces an AV signal while sequentially changing the external inputs of the AV receiver 101. The AV receiver 101 may be configured to reproduce an AV signal by changing an external input once every time a message for requesting to detect an external input is received. In this case, the user who is controlling the AV receiver 101 by using the TV 102 must control the TV 102 to repeatedly transmit a message for requesting to detect an external input to the AV receiver 101, by continuously selecting the 'external input change' item until the user can perceive an AV signal of the STB 103.

In operation 227, the TV 102 transmits a predetermined acknowledgement message to the AV receiver 101 as a response to the reproduction performed in operation 226.

If an AV signal of the STB 103 is reproduced while an AV signal is reproduced by sequentially changing the external inputs of the AV receiver 101 in operation 226, the user selects an 'OK' item of the UI illustrated in FIG. 6. When the user selects the 'OK' item, the TV 102 transmits the acknowledgement message to the AV receiver 101.

In operation 228, the AV receiver 101 assigns an external input, through which a currently reproduced AV signal is received, to the STB 103. If the AV receiver 101 has received the acknowledgement message in operation 227, the currently reproduced AV signal is determined as an AV signal of the STB 103, and thus the AV receiver 101 assigns the external input, through which the currently reproduced AV signal is received, to the STB 103. After the external input is assigned to the STB 103, the AV receiver 101 reproduces the AV signal received through the assigned external input in operation 230.

The messages of operations 223, 225, and 227 are messages transmitted for the TV 102 to control the AV receiver 101, and are transmitted via a predetermined network instead of an external input, which is the same as the message of operation 210 for requesting to reproduce an AV signal. The predetermined network may be the network connected using HDMI-CEC as illustrated in FIG. 1. However, types of the predetermined network are unlimited, only if the predetermined network is a network connected to control devices that are connected to each other. That is, the predetermined network may be a wireless communication network using infrared rays, such as IrDA, or an IP-based wireless network, such as a WLAN.

FIGS. 2, 4, and 5 illustrate the methods of reproducing an AV signal of the STB 103 by controlling the AV receiver 101 using the TV 102. In other words, FIGS. 2, 4, and 5 illustrate the methods of reproducing an AV signal when a control device controlling the AV receiver 101 is different from an AV device providing the AV signal. However, even when the control device controlling the AV receiver 101 is the TV 102 and an AV signal of the TV 102 is reproduced by the AV receiver 101, i.e., when the control device is the same as the AV device providing the AV signal, the methods illustrated in FIGS. 2, 4, and 5 can still be applied.

Figure 7:
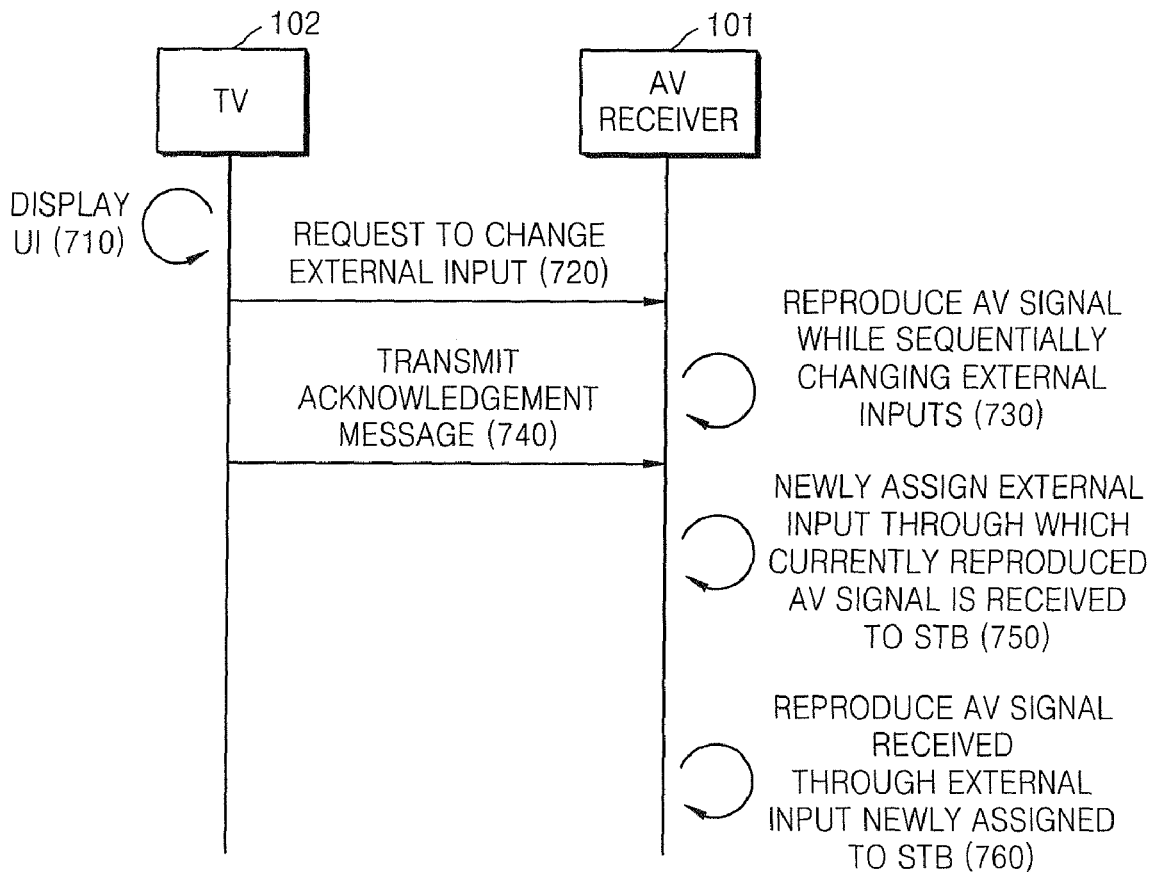
FIG. 7 is a signaling diagram of a method of reproducing an AV signal according to another exemplary embodiment of the present invention.

FIG. 7 is a signaling diagram of a method of reproducing an AV signal according to another exemplary embodiment of the present invention.

FIGS. 4 through 6 illustrate the methods of newly assigning an external input to the STB 103, when no external input is currently assigned to the STB 103. However, a case may exist where, even though an external input assigned to the STB 103 exists, another external input of the AV receiver 101 must be assigned to the STB 103 again since the external input connected to the STB 103 is changed. FIG. 7 illustrates a method of assigning a new external input to the STB 103 in this case.

FIG. 7 illustrates a case where the TV 102 controls the AV receiver 101 in order to reproduce an AV signal of the STB 103 by using the AV receiver 101 in the AV system illustrated in FIG. 1, like the case illustrated in FIG. 2.

Referring to FIG. 7, in operation 710, the TV 102 provides a predetermined UI to the user, so that the user can change an external input.

Since a new external input must be assigned to the STB 103 due to a change of the external input assigned to the STB 103, the TV 102 provides the predetermined UI for changing an external input by means of the display module.

Figure 8:
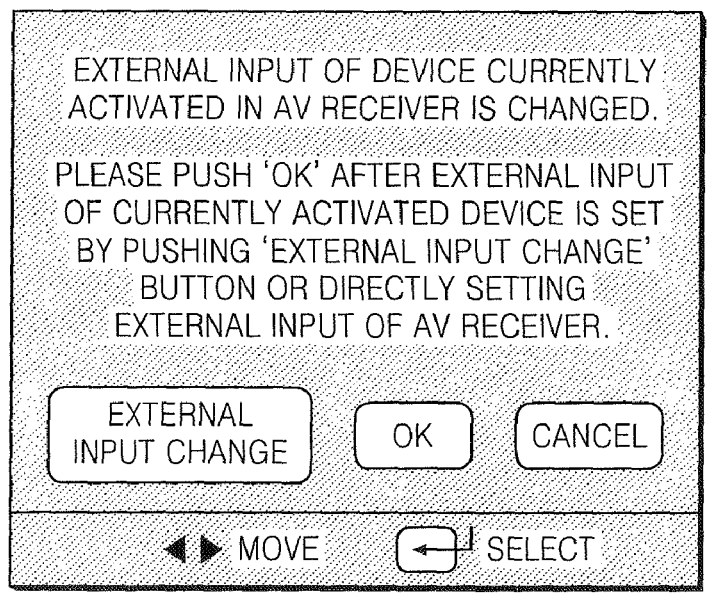
FIG. 8 illustrates a UI for changing an external input according to an exemplary embodiment of the present invention.

FIG. 8 illustrates a UI for changing an external input according to an exemplary embodiment of the present invention.

Referring to FIG. 8, the UI provided to the user in operation 710 informs the user that the external input assigned to the STB 103 from among the external inputs of the AV receiver 101 will be changed. In addition, the UI includes an 'external input change' item for changing an external input through which an AV signal is received. The UI also provides a 'cancel' item for canceling the change of an external input. A method of controlling the AV receiver 101 using the UI will be described later.

Referring back to FIG. 7, in operation 720, the TV 102 transmits a message for requesting to change an external input to the AV receiver 101.

If the user selects the 'external input change' item of the UI illustrated in FIG. 8, the TV 102 transmits to the AV receiver 101 a message for requesting to change an external input through which an AV signal is received.

In operation 730, the AV receiver 101 reproduces an AV signal received through an external input while sequentially changing the external inputs of the AV receiver 101. That is, the AV receiver 101 reproduces the AV signal while sequentially changing the external inputs of the AV receiver 101, so that the user can perceive an external input through which an AV signal of the STB 103 is received.

If the AV receiver 101 receives the message for requesting to change an external input from the TV 102 in operation 720, the AV receiver 101 reproduces an AV signal while sequentially changing the external inputs of the AV receiver 101 in operation 730. The AV receiver 101 may be configured to reproduce an AV signal by changing an external input once every time the message for requesting to change an external input is received. In this case, the user who is controlling the AV receiver 101 using the TV 102 must control the TV 102 to repeatedly transmit the message for requesting to change an external input to the AV receiver 101, by continuously selecting the 'external input change' item until the user can perceive an AV signal of the STB 103.

In operation 740, the TV 102 transmits a predetermined acknowledgement message to the AV receiver 101 as a response to the reproduction performed in operation 730.

If an AV signal of the STB 103 is reproduced while an AV signal is reproduced by sequentially changing the external inputs of the AV receiver 101 in operation 730, the user selects an 'OK' item of the UI illustrated in FIG. 8. When the user selects the 'OK' item, the TV 102 transmits the acknowledgement message to the AV receiver 101.

In operation 750, the AV receiver 101 assigns an external input, through which a currently reproduced AV signal is received, to the STB 103. If the AV receiver 101 has received the acknowledgement message in operation 740, the currently reproduced AV signal is determined as an AV signal of the STB 103, and thus the AV receiver 101 assigns the external input, through which the currently reproduced AV signal is received, to the STB 103. After the external input is assigned to the STB 103, the AV receiver 101 reproduces the AV signal received through the assigned external input in operation 760.

The messages of operations 720 and 740 are messages transmitted for the TV 102 to control the AV receiver 101, and are transmitted via a predetermined network instead of an external input, which is the same as the message for requesting to reproduce an AV signal. The predetermined network may be the network connected using HDMI-CEC illustrated in FIG. 1. However, types of the predetermined network are unlimited, only if the predetermined network is a network connected to control devices that are connected to each other. That is, the predetermined network may be a wireless communication network using infrared rays, such as IrDA, or an IP-based wireless network, such as a WLAN.

FIG. 7 illustrates the method of reproducing an AV signal of the STB 103 by assigning another external input to the STB 103 by controlling the AV receiver 101 using the TV 102. In other words, FIG. 7 illustrates the method of reproducing an AV signal when a control device controlling the AV receiver 101 is different from an AV device providing the AV signal. However, the method illustrated in FIG. 7 can be applied even when the control device controlling the AV receiver 101 is the TV 102 and an AV signal of the TV 102 is reproduced by the AV receiver 101, i.e., when the control device is the same as an AV device providing the AV signal.

Although FIGS. 2 through 8 illustrate the methods using the AV receiver 101, the TV 102, and the STB 103, the AV receiver 101, the TV 102, and the STB 103 are only examples of AV devices, and it will be understood by those of ordinary skill in the art that the present invention can be applied to other AV devices.

Figure 9:
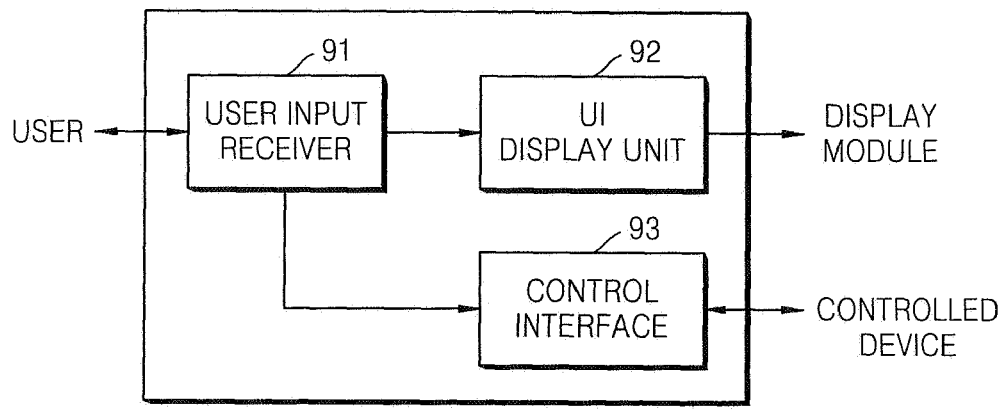
FIG. 9 is a block diagram of a control apparatus of a control device according to an exemplary embodiment of the present invention.

FIG. 9 is a block diagram of a control apparatus of a control device according to an exemplary embodiment of the present invention.

The control device is a device for controlling devices to be controlled, i.e., AV devices such as the AV receiver 101. That is, the control device controls power of the AV devices or controls the AV devices to reproduce an AV signal received through a predetermined external input.

Referring to FIG. 9, the control apparatus of the control device includes a user input receiver 91, a UI display unit 92, and a control interface 93.

The user input receiver 91 receives a signal for controlling a controlled device, which is transmitted by a user. If the control device is the TV 102, the user input receiver 91 receives a signal for controlling a device to be controlled, which is transmitted by a user using a remote control, through an infrared receiver.

The UI display unit 92 provides a UI for controlling a controlled device to the user. The UI display unit 92 can provide the UI using a method of transmitting an image signal to a predetermined display module. The UI display unit 92 provides UIs, such as the UIs illustrated in FIGS. 6 and 8, to the user.

The control interface 93 transmits and receives a control message according to a predetermined control protocol. The control interface 93 transmits and receives the control message to and from the device to be controlled, wherein the device to be controlled may be the AV receiver 101 or other AV device. The control message may include a reproduction request message, an external input detection message, an external input change message, and an acknowledgement message, which are described above. It was also described above that the type of network used for transmitting and receiving the control message is unlimited.

Figure 10:
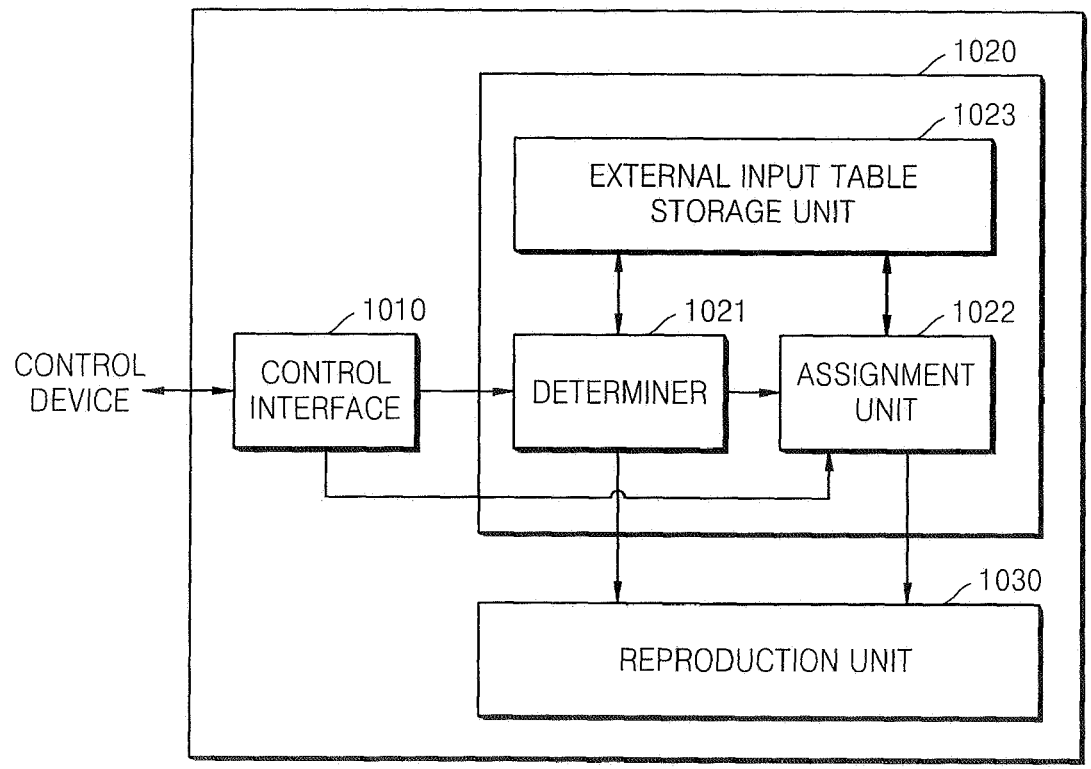
FIG. 10 is a block diagram of an apparatus for reproducing an AV signal in a device to be controlled according to an exemplary embodiment of the present invention.

FIG. 10 is a block diagram of an apparatus for reproducing an AV signal in a device to be controlled according to an exemplary embodiment of the present invention.

Referring to FIG. 10, the reproduction apparatus includes a control interface 1010, an external input controller 1020, and a reproduction unit 1030.

The control interface 1010 transmits and receives a control message according to a predetermined control protocol to and from the control apparatus illustrated in FIG. 9.

The external input controller 1020 searches for an external input assigned to another device by referring to an external input table based on the control message received by the control interface 1010. The external input controller 1020 searches for an external input assigned to an AV device of which reproduction of an AV signal is requested by the control message, by referring to the external input table, and controls external inputs so that the reproduction unit 1030 reproduces the AV signal received through the external input assigned to the AV device of which reproduction of an AV signal is requested. The external input controller 1020 also modifies or updates the external input table.

According to this exemplary embodiment, the external input controller 1020 includes a determiner 1021, an assignment unit 1022, and an external input table storage unit 1023.

The determiner 1021 determines whether an external input has been assigned to a predetermined AV device of which reproduction of an AV signal is requested by the control device. That is, the determiner 1021 determines, by referring to an external input table stored in the external input table storage unit 1023, whether an external input has been assigned to the AV device of which reproduction of an AV signal is requested.

If it is determined that an external input has been assigned to the AV device of which reproduction of an AV signal is requested, the determiner 1021 controls the reproduction unit 1030 to reproduce the AV signal received through the assigned external input.

If it is determined that an external input has not been assigned to the AV device of which reproduction of an AV signal is requested, the assignment unit 1022 detects an external input through which an AV signal of the AV device is received.

The assignment unit 1022 can detect the external input by transmitting and receiving a control signal to and from the control device, and the method of detecting an external input has been described above with reference to FIGS. 4, 5, and 7.

The assignment unit 1022 modifies the external input table by assigning the detected external input to the AV device of which reproduction of an AV signal is requested, and controls the reproduction unit 1030 to reproduce the AV signal received through the assigned external input.

When an external input which is already assigned to a predetermined AV device is assigned again, the assignment unit 1022 detects the external input by directly receiving a control message from the control interface 1010, and newly assigns the detected external input to the AV device.

The reproduction unit 1030 reproduces the AV signal received through the external input assigned to the AV device of which reproduction of an AV signal is requested, based on the search result of the external input controller 1020.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to an exemplary embodiment of the present invention, an external input of an AV device can be set from the outside through a predetermined network connected to control devices that are connected to each other.

In addition, since the AV device can dynamically assign an external input to an external device of which reproduction of an AV signal is requested, a user can set external inputs of the AV device using a method in which the necessary manipulation performed by a user is minimized, even when an external input connected to the external device is changed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of reproducing an AV signal of a third device by a first device according to a request from a second device, the method comprising:

receiving a reproduction request for reproducing an AV signal of the third device, the reproduction request being transmitted from the second device;

determining whether an external input of the first device is assigned to the third device by referring to an external input table; and if an external input of the first device is assigned to the third device, then reproducing, by the first device, an AV signal received through the external input assigned to the third device.

2. The method of claim 1, wherein the first device is an AV receiver reproducing an audio signal received through the external input and the second device is a TV.

3. The method of claim 2, wherein the AV signal is an audio signal.

4. The method of claim 3, wherein the third device is a set-top box.

5. The method of claim 2, wherein the determining whether an external input is assigned to the third device further comprises:

if it is determined that no external input is assigned to the third device, then assigning one of external inputs of the first device to the third device.

6. The method of claim 5, wherein the assigning comprises:

transmitting a message to the TV informing that no external input is assigned to the third device;

receiving a message transmitted from the TV for requesting to detect an external input, as a response to the message informing that no external input is assigned to the third device;

reproducing an AV signal received through each external input while sequentially changing the external inputs of the AV receiver, based on the message for requesting to detect the external input;

receiving an acknowledgement message transmitted from the TV as a response to the reproduction of the AV signal by sequentially changing the external inputs; and assigning to the third device an external input through which a currently reproduced AV signal is received, in response to the acknowledgement message.

7. The method of claim 2, wherein the AV receiver is connected to the TV by High-Definition Multimedia Interface-Consumer Electronics Control (HDMI-CEC).

8. The method of claim 5, wherein the assigning comprises:

detecting an external input through which the AV signal is received; and assigning the detected external input to the third device.

9. The method of claim 8, wherein the detecting comprises:

detecting an external input from which a pilot signal included in the AV signal is detected or an external input from which a magnitude of the AV signal is detected as a predetermined magnitude as an external input through which the AV signal is to be received.

10. An apparatus for reproducing an AV signal of a third device by a first device according to a request from a second device, the apparatus comprising:

an interface which receives a reproduction request for reproducing the AV signal of the third device, the reproduction request being transmitted from the second device;

a determiner which determines whether an external input of the first device is assigned to the third device by referring to an external input table; and a reproduction unit which if an external input of the first device is assigned to the third device, then reproduces, by the first device, an AV signal received through the external input assigned to the third device.

11. The apparatus of claim 10, wherein the first device is an AV receiver reproducing an audio signal received through the external input and the second device is a TV.

12. The apparatus of claim 11, wherein the AV signal is an audio signal.

13. The apparatus of claim 12, wherein the third device is a set-top box.

14. The apparatus of claim 11, wherein the AV receiver is connected to the TV by High-Definition Multimedia Interface-Consumer Electronics Control (HDMI-CEC).

15. The apparatus of claim 11, wherein the apparatus for reproducing the AV signal of the third device by a first device further comprises:

an assignment unit which, if it is determined that no external input is assigned to the third device, then detects an external input through which the AV signal is received and assigns the detected external input to the third device.

16. The apparatus of claim 15, wherein the assignment unit detects an external input from which a pilot signal included in the AV signal is detected or an external input from which a magnitude of the AV signal is detected as a predetermined magnitude as an external input through which the AV signal is to be received.

17. A non-transitory computer readable recording medium storing a computer program for performing a method of reproducing an AV signal of a third device by a first device according to a request from a second device, the method comprising:

receiving a reproduction request for reproducing an AV signal of the third device, the reproduction request being transmitted from the second device;

determining whether an external input of the first device is assigned to the third device by referring to an external input table; and if an external input of the first device is assigned to the third device, then reproducing, by the first device, an AV signal received through the external input assigned to the third device.

18. A method of reproducing an AV signal of a second device by a first device according to a request from the second device, the method comprising:

receiving a reproduction request for reproducing an AV signal of the second device, the reproduction request being transmitted from the second device;

determining whether an external input of the first device is assigned to the second device by referring to an external input table; and if an external input of the first device is assigned to the second device, then reproducing, by the first device, an AV signal received through the external input assigned to the second device, wherein the first device is an AV receiver reproducing an audio signal received through the external input and the second device is a TV, wherein the determining whether an external input of the first device is assigned to the second device further comprises:

if it is determined that no external input is assigned to the TV, then assigning one of external inputs of the first device to the TV, and wherein the assigning comprises:

transmitting a message to the TV informing that no external input is assigned to the TV;

receiving a message transmitted from the TV for requesting to detect an external input, as a response to the message informing that no external input is assigned to the TV;

reproducing an AV signal received through each external input while sequentially changing the external inputs of the AV receiver, based on the message for requesting to detect the external input;

receiving an acknowledgement message transmitted from the TV as a response to the reproduction of the AV signal by sequentially changing the external inputs; and assigning to the TV an external input through which a currently reproduced AV signal is received, in response to the acknowledgement message.

19. The method of claim 18, wherein the AV signal is an audio signal.

20. An apparatus for reproducing an AV signal of a second device by a first device according to a request from a second device, the apparatus comprising:

an interface which receives a reproduction request for reproducing the AV signal of the second device, the reproduction request being transmitted from the second device;

a determiner which determines whether an external input of the first device is assigned to the second device by referring to an external input table; and a reproduction unit which if an external input of the first device is assigned to the second device, then reproduces an AV signal received through the external input assigned to the second device, wherein the first device is an AV receiver reproducing an audio signal received through the external input and the second device is a TV, wherein the apparatus for reproducing the AV signal of the second device by a first device further comprises:

an assignment unit which, if it is determined that no external input is assigned to the TV, then detects an external input through which the AV signal is received and assigns the detected external input to the TV, and wherein the assigning comprises:

transmitting a message to the TV informing that no external input is assigned to the TV;

receiving a message transmitted from the TV for requesting to detect an external input, as a response to the message informing that no external input is assigned to the TV;

reproducing an AV signal received through each external input while sequentially changing the external inputs of the AV receiver, based on the message for requesting to detect the external input;

receiving an acknowledgement message transmitted from the TV as a response to the reproduction of the AV signal by sequentially changing the external inputs; and assigning to the TV an external input through which a currently reproduced AV signal is received, in response to the acknowledgement message.

21. The apparatus of claim 20, wherein the AV signal is an audio signal.

22. The apparatus of claim 20, wherein the assignment unit detects an external input from which a pilot signal included in the AV signal is detected or an external input from which a magnitude of the AV signal is detected as a predetermined magnitude as an external input through which the AV signal is to be received.

23. A non-transitory computer readable recording medium storing a computer program for performing a method of reproducing an AV signal of a second device by a first device according to a request from the second device, the method comprising:

receiving a reproduction request for reproducing an AV signal of the second device, the reproduction request being transmitted from the second device;

determining whether an external input of the first device is assigned to the second device by referring to an external input table; and if an external input of the first device is assigned to the second device, then reproducing an AV signal received through the external input assigned to the second device, wherein the first device is an AV receiver reproducing an audio signal received through the external input and the second device is a TV, wherein the determining whether an external input of the first device is assigned to the second device further comprises:

if it is determined that no external input is assigned to the TV, then assigning one of external inputs of the first device to the TV, and wherein the assigning comprises:

transmitting a message to the TV informing that no external input is assigned to the TV;

receiving a message transmitted from the TV for requesting to detect an external input, as a response to the message informing that no external input is assigned to the TV;

reproducing an AV signal received through each external input while sequentially changing the external inputs of the AV receiver, based on the message for requesting to detect the external input;

receiving an acknowledgement message transmitted from the TV as a response to the reproduction of the AV signal by sequentially changing the external inputs; and assigning to the TV an external input through which a currently reproduced AV signal is received, in response to the acknowledgement message.

* * * * *